(12) United States Patent
Prokoski (10) Patent No.: US 7,236,596 B2
(45) Date of Patent: Jun. 26, 2007

(54) DIGITAL IMAGING SYSTEM FOR EVIDENTIARY USE

(75) Inventor: Francine J. Prokoski, Fairfax Station, VA (US)

(73) Assignee: Mikos, Ltd., Fairfax Station, VA (US)

( * ) Notice: Subject to any disclaimer, the term of this patent is extended or adjusted under 35 U.S.C. 154(b) by 507 days.

(21) Appl. No.: 09/778,967

(22) Filed: Feb. 7, 2001

(65) Prior Publication Data

US 2001/0033661 A1 Oct. 25, 2001

Related U.S. Application Data

(60) Provisional application No. 60/180,783, filed on Feb. 7, 2000.

(51) Int. Cl.
 *H04K 1/10* (2006.01)
(52) U.S. Cl. .......................................... 380/258; 726/30
(58) Field of Classification Search ................ 382/299, 382/298, 300; 380/229, 258; 713/179, 176; 726/30
See application file for complete search history.

(56) References Cited

U.S. PATENT DOCUMENTS

| | | | | |
|---|---|---|---|---|
| 5,349,550 A | * | 9/1994 | Gage | 708/422 |
| 5,583,950 A | * | 12/1996 | Prokoski | 382/212 |
| 5,646,997 A | * | 7/1997 | Barton | 713/176 |
| 5,664,018 A | | 9/1997 | Leighton | |
| 5,764,770 A | * | 6/1998 | Schipper et al. | 713/176 |
| 5,799,082 A | * | 8/1998 | Murphy et al. | 713/179 |
| 5,841,886 A | * | 11/1998 | Rhoads | 382/115 |
| 5,862,217 A | * | 1/1999 | Steinberg et al. | 713/176 |
| 5,892,900 A | | 4/1999 | Ginter et al. | |
| 5,910,987 A | | 6/1999 | Ginter et al. | |
| 5,915,019 A | | 6/1999 | Ginter et al. | |
| 5,917,912 A | | 6/1999 | Ginter et al. | |
| 5,920,861 A | | 7/1999 | Hall et al. | |
| 5,982,932 A | | 11/1999 | Prokoski | |
| 6,269,446 B1 | * | 7/2001 | Schumacher et al. | 713/176 |
| 6,526,158 B1 | * | 2/2003 | Goldberg | 382/115 |
| 6,642,956 B1 | * | 11/2003 | Safai | 348/222.1 |
| 6,671,376 B1 | * | 12/2003 | Koto et al. | 380/210 |

OTHER PUBLICATIONS

California Evidence Code, Section 1500.6.

(Continued)

*Primary Examiner*—Kambiz Zand
*Assistant Examiner*—Andrew L. Nalven
(74) *Attorney, Agent, or Firm*—Whitham, Curtis, Christofferson & Cook, P.C.

(57) ABSTRACT

The Evidentiary Imaging System (EIS) provides secure storage or transmission of a digital image into which is encoded the date, time, and location at which the image was taken, along with the camera ID and frame number. The encoding is dispersed throughout the image so that the image cannot be modified without distorting the encoding. The image may be encrypted for additional security. Annotation can be superimposed on the encoded or encoded and encrypted image to classify or identify the image to human or automated scanning systems. The annotation can also be used to key the decoding and decryption tasks. The EIS produces imagery which may be authenticated as to originality, time and location of imaging. The imagery may be stored, duplicated, and transmitted while retaining its authenticity. However, any modifications to the image, including any local changes, are readily detected because the encoding will not decode correctly.

34 Claims, 9 Drawing Sheets

OTHER PUBLICATIONS

State court proceedings including: *Hannewacker* v. *City of Jacksonville Beach*, 419 So. 2d 308 (Fla 1982); *Wagner* v. *State*, 707 So. 2d 827 (Fla 1st DCA); *Nooner* v. *State*, 907 S.W.2d 677 (Ark. 1985); *English* v. *State* (422 S.E.2d 924 (Ga.Ct.App. 1992).

* cited by examiner

NYC IBM #23
99/12/25/12/15/00

DIGITAL IMAGING SYSTEM FOR EVIDENTIARY USE

This application for patent claims priority from U.S. Provisional Patent Application 60/180,783 filed Feb. 7, 2000.

BACKGROUND OF THE INVENTION

1. Field of the Invention

The present invention generally relates to techniques for authenticating digital images, and in particular to techniques for encoding authentication information and distributing that information throughout the image.

2. Background Description

Digital cameras offer high-resolution immediate imagery which can be processed and transmitted electronically without the need for scanning and digitizing a hard copy photograph. The digital nature of the resulting imagery, however, makes it more vulnerable to undetected manipulation in whole or in part. Where the imagery has evidentiary use, it is essential to incorporate a technique by which to determine that an image has not been altered.

Since it is often essential to know the precise date, time, and location where the image was taken, what imaging device was used, and who took the image, the apparatus and method of the present invention use an encoding of that information distributed throughout the image as a secure means of providing that information as well as a certificate of originality.

The method and apparatus of the present invention does not require the use of flash correlation. However, that technique provides a computationally simple and therefore rapid capability for decoding the two-dimensional encodings of data which provide authentication. Furthermore, flash correlation is fast enough to exhaustively consider all possibilities when certain encoded information is unknown, such as the ID of the specific camera used, the ID of the user, or the frame number or exact time of day a given image was taken. Alternately, steganography can be used.

Presence of a flash correlation artifact (FCA) between a Resultant Image and an encrypted representation of the Encoded Data Array is sufficient to identify its date/time, location, and source. Each of those values can be separately identified, or all can be simultaneously verified. Presence of an FCA between a Resultant Image and an Encrypted version of the Original Image indicates that the Resultant Image is authentic, It is not necessary to decrypt the Resultant Image or to perform pixel by pixel comparison in order to authenticate the image. Authentication of an image can be performed in one operation, regardless of the complexity of the image.

Confirmation of the camera ID, the date/time, and the location can be separately made, with or without being cued by annotation on the image.

Multi-colored or multi-grey level images can be similarly authenticated. Their complement is created by inversion of the grey scale or color chart. Alternately, colored images can be broken into components and represented by three layers of grey scale values, each of which is separately encoded and encrypted.

SUMMARY OF THE PRIOR INVENTIONS

The term "flash correlation " refers to the instantaneous indication of massive correlation between two or more images through the process of overlaying two images, with one rotated and either inverted or not inverted with respect to the other, so as to produce a region with density statistically higher or lower than the rest of the overlaid image area, when and only when there is sufficient similarity between the two images. The two images may be scrambled prior to being overlaid in order to produce a more uniform density distribution. When pixelized images are so scrambled and there is strong correlation between the two images, the resulting flash correlation artifact will be a square centered at the point of rotation.

The term "flash correlation artifact" (FCA) means a region of statistically different density, which may be repositioned within the overlaid area by relative translation of the two overlaid patterns having relative rotation. The existence of the FCA or flash correlation artifact serves to: authenticate that an unknown pattern is included within a set of known images and identify matches between unknown and known specific images. Analysis of the FCA density provides a quantitative measure of the correlation between any two images.

The use of flash correlation-generated patterns for authentication of documents and other images was included in U.S. Pat. No. 5,583,950 point of novelty #21. "By utilizing either pseudorandom-generated patterns, or read-after-write random patterns, flash correlation offers the ability to overlay additional patterns as an item advances through a manufacturing or distribution cycle. The total composite pattern, or any of the subpatterns can subsequently be authenticated or identified."

In the present invention, the Encoded Data Array may be added to the Original Array either before or after encryption. If before, then the Resultant Array must be decrypted prior to using flash correlation to authenticate the image and decode the data. This makes the image available in the clear during authentication and decoding. If the Encoded Data Array is added after encryption, then flash correlation can be used to authenticate the image and decode the data without decrypting the image.

SUMMARY OF THE INVENTION

The present invention is an Evidentiary Imaging System (EIS) and is comprised by two subsystems: the Imaging and Encoding Subsystem and the Receiving and Authentication Subsystem. Transmission of the information between the two subsystems can be via any method for electronic or physical transfer.

In the primary embodiment as an enhancement to a digital video camera, the EIS Imaging and Encoding Subsystem includes: a digital imaging sensor, a GPS receiver, a Greenwich Mean Time receiver, the camera ID, a frame counter and an encoding generator. The resultant system collects in real time the date, time, and location in which an image is captured. It encodes that information into the image. It may also annotate the information onto the image in alphanumeric format if the user selects that option. The encoding scheme uses a camera ID code that is different for each camera, and another code which is different for each frame of imagery taken with that camera. Therefore the encoded information changes with the particular camera used, as well as with the date, time, location, and frame number. The subsystem may also incorporate a biometric technique which permits only an identified and authorized user to operate the system, or which encodes the identity of the camera user along with the other encoded information, or both.

In the primary embodiment, the EIS Receiving and Authentication Subsystem includes: an image receiver, annotation detection and readout capability, decryption, decoding, and authentication, followed by restoration of the image. A decision output is also included to display or otherwise transmit the results of the authentication test.

The present invention also provides a method for authenticating digital images. The image is captured, and then authentication information is recorded at the time and place of capturing. This authentication information is unique to the digital image and includes at least one piece of information from a source independent of the capturing process, such as GMT and/or GPS information from satellites. The authentication information is encoded into a data array in a manner which can be mapped to the digital image, thereby creating a composite array. Optionally, the composite array can be encrypted and annotated. Then, in order to authenticate whether a target composite array is an authentic copy of the composite array, the data array of authenticating information is compared to the target composite array.

Various approaches may be used for the encoding and encryption functions within the EIS. The camera ID can be encoded in hardware by placing dots on the lens, by modifying the pixels in the detector array (effectively creating a number of "bad pixels") or other hardware or software techniques. The frame counter, and the input from the GPS and GMT receivers are encoded via software. The resultant from the encoding steps is an array of pixels called the Encoded Data Array.

The Encoded Data Array can be a binary array which is superimposed on the Original Image Array, being logically "OR'd" with it. Alternately, pixels in the Encoded Data Array can be grey scale or color, and can be added, subtracted, or used to replace the corresponding pixels in the taken image. The simplest and primary embodiment uses binary Encoded Data Array pixels which are logically OR'd with the Original Image Array. The resulting image is called the "Composite Image".

The Composite Image can be scrambled or encrypted prior to storage or transmission. The resulting image is called the "Encrypted Composite Array". For simplicity, it is assumed that this step is always performed, but may include a "Null encryption" in which no change occurs to the Composite Image.

Some or all of the information used to create the Encoded Data Array can be annotated onto the Encrypted Composite Array so as to be visible to the human eye or to sorting mechanisms. The resulting image is called the Annotated Encrypted Composite Array. For simplicity, it is assumed that this step is always performed, but may include a "Null annotation" in which no information is annotated on the Encrypted Composite Array. The Encrypted Composite Array is the "Resultant Image" from the EIS Imaging subsystem.

Resultant images can be transmitted, stored, printed, and otherwise distributed. However, any processing, including compression and expansion, will create alteration in the Resultant image. Additional subsequent processing will create further alteration. Processing of a part of the image will create detectable alteration in that part.

Certain recipients may be given the ability to decrypt the Resultant Image but not the ability to decode the Encoded Data Array.

Other recipients may be given the ability to extract the Encoding, or to authenticate one or more of the camera ID, frame number, date/time, location, and user ID, but not the ability to extract and authenticate all of them.

Recipients who have the ability to extract and authenticate all of the parameters associated with the imagery are called Authenticating Recipients.

Entities which are not users of the imagery may independently provide authentication services, which might include providing cameras, and analyzing Resultant Imagery. These entities or persons may serve as expert witnesses to testify to the authenticity of the Resultant Imagery, and explain the procedures in evidentiary proceedings. These persons are called "Certifiers". Among their duties is determining the precision of the location and time information encoded on an image, and the statistical level of confidence in asserting that an image has or has not been modified; that is, that it is or is not an authentic original taken at the encoded time and location by a particular camera and user.

Certifiers are responsible for maintaining the encoding keys for each camera. They can be the camera manufacturers, the owner of one or more cameras, or any organization responsible for providing expert witness as to the facts surrounding the imagery's collection.

The imagery collected by the camera can be in the normal visual band, or can be infrared, ultraviolet, x-ray, sonogram, or any medical or hyperspectral imagery producing a 2-D or 3-D digital image. Additional information can be input through a keyboard, scanner, or other means and be also encoded, including alphanumeric data such as the name of the photographer or subject. Alternately, the EIS can include a speech recognition module which translates spoken information into text for encoding.

The EIS camera can be a video sequencer, which takes multiple images over an interval of time. The EIS encoding provides timestamping of each frame to document the timing of recorded events. The EIS provides tamper indicating secure transmission of imagery electronically via satellite, or RF, or landline or other communications network including the public telephone network.

Rather than a camera, the EIS may use another source, such as a scanner or computer software which produces a document or image. The output of this source is input to the EIS in place of the camera input. The EIS may be a component of a secure computer network and be automatically triggered by operations to a document or image such as; saving, transmission, printing, or duplication. The EIS Encoded Data Array would include a code which represents the terminal or workstation which originated the work or which is transmitting it. The work may have previously been encoded with other date, time, and source. Multiple sets of encoded layers may be applied without affecting the accuracy of the authentication. That ability to overlay and separately readout multiple layers is an important advantage of flash correlation.

The Evidentiary Imaging System (EIS) has several important applications. These include providing:

Authentication of documents and images generated by computer and then stored, printed, or transmitted.

On-the-fly secure encoding of date, time, and origination point of computer-generated products.

Documentation of the date/time and location of crime scene photographs which are to be used for evidentiary purposes.

Insurance claim photographs of automobiles, houses, boats, or other damages with date/time, location and authentication features.

Surveillance images triggered by intrusion sensors, electronic keys, door openings, etc. with automatic date/time and source information encoded prior to storage and/or transmission.

Documentation of events such as the signing of a will or contract, with date/time, location, source, and authenticating features in every frame.

Images of actual signatures on documents; providing automated date/time and location for electronic signatures.

Archival Identity Photographs at ATMs, point of sale (POS) terminals, check cashing facilities, bank teller windows, or other locations of financial transactions.

Documenting the condition of an item being sold "as is", including houses, cars, boats, furniture, carpets, etc. either using single frame or digital video imagery.

Documenting the medical condition of a patient at admittance, or as indicated by any imaging sensor.

Time clock records of employees entrances and exits from a facility.

Documentation of accesses to and time in hazardous areas.

News event documentation indicating the authenticity of the imagery taken as well as the date/time and source.

Accident reconstruction, when the EIS is installed for example in the front end of a vehicle or incorporated into its roofline, and is triggered by air bag activation.

Traffic control cameras which are triggered by vehicle speed sensors or by motion sensors during red-light conditions.

Recording of significant or record-breaking events such as at the finish line at racetracks, or at checkpoints of a rally or long distance race.

Recording absence of activity, or providing alibis at specific locations and times.

Detecting altered images.

Detecting unauthorized use of copyrighted images.

Establishing ownership of disputed images.

The EIS can also include additional memory and processing features. Any number of EIS units can be deployed to surveil an area to record and document events of interest. EIS units can be connected to a communications link in order to provide realtime information in a secure method to a central operations station. That central station can hold the decryption and decoding keys to all the EIS, enabling it to authenticate and analyze the received imagery either in real time or with postprocessing.

Ancillary benefits provided by the EIS include automatic synchronization of a network of cameras, automatic annotation of location and time, automatic logging of camera use and user.

Novelty Compared to Existing Devices

Current surveillance cameras include those which incorporate built-in ID numbers, clocks and frame numbers, and keypads which allow the location to be input via keypad—with all that data annotated onto the resulting single frame or video imagery. The resulting imagery can be encrypted or scrambled prior to transmission, and authorized recipients can decrypt or descramble the imagery. Annotation can be applied before or after encryption.

Other authentication or counterfeit detection techniques have been developed to place authenticating information into an image such that it is not obvious, and cannot be removed without leaving indication of that process.

The present invention, however, offers the novelty of utilizing GPS and GMT receivers for automatic determination of time and location which is not prone to human error or manipulation. It also offers the preferred use of flash correlation for rapid readout and authentication of all encoded information, or of any one or more elements. That provides the capability to separately control who has the ability to determine certain information about received images.

The use of Date/time and Location information as keys or seeds to the encoding and encryption processes ensures non-repetition of those elements; increasing the security of the system. By designing these modules into the EIS, the devices can be sealed at the factory and then installed anywhere for automatic operation. Alternately, they can be manually operated at various locations without any user controls other than turning the system on and triggering the image taking.

This greatly simplifies the training needed, improves the chain of custody of the collected information, standardizes the technique for authentication, and allows the automated use of the system in emergency situations, such as recording vehicle crashes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
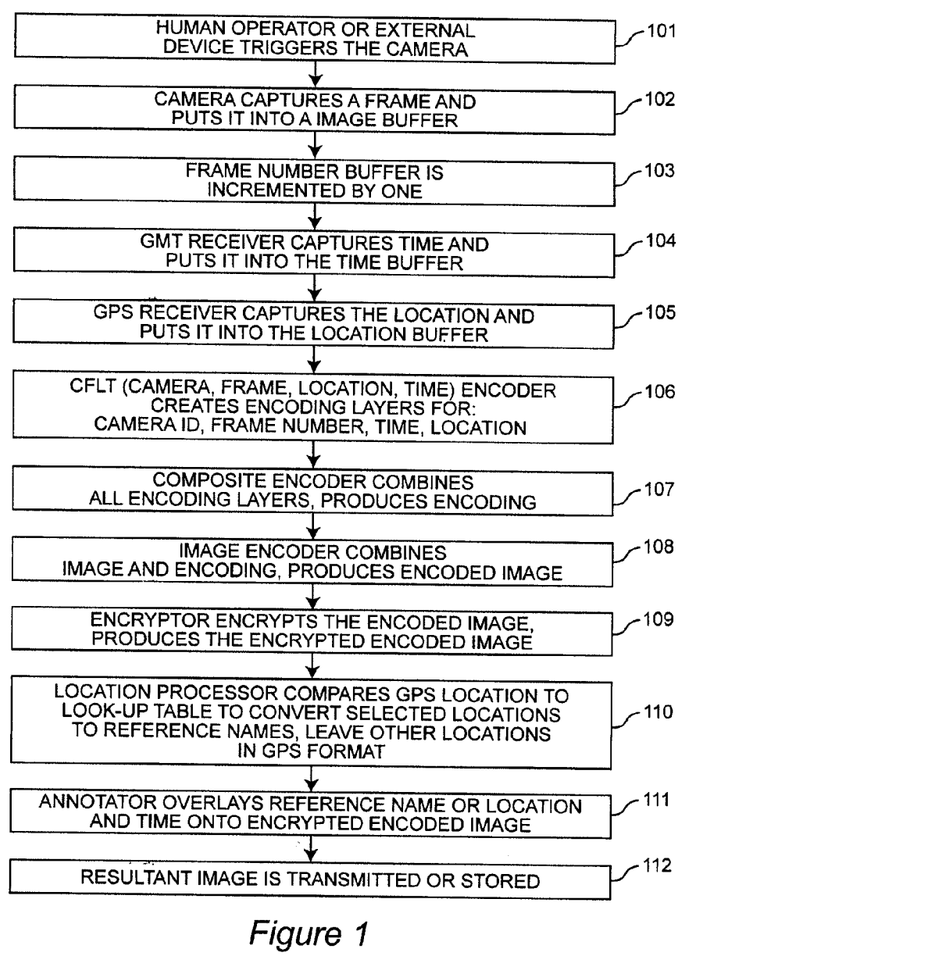
FIG. 1 is a flow chart of the imaging and encoding method of the invention.

Referring now to the drawings, and more particularly to FIG. 1, there is shown the method of encoding by the Evidentiary Imaging System. The human operator or an external sensor triggers 101 the camera, the GPS and GMT receivers, and the frame number incrementing device.

The camera captures a frame of imagery and stores it 102 in the digital image buffer. The frame number is incremented and stored 103 in the frame buffer. The GMT receiver captures the time and stores it 104 in the time buffer. The GPS receiver captures the location and stores it 105 in the location buffer. The encoder uses the camera ID, frame, location, and time to produce an encoding 106 of each status information. The composite encoder combines the encoding layers to form a composite encoding 107. The image encoder combines the image and the encoding to produce the encoded image 108. The encrypter encrypts the encoder image to produce the encrypted encoded image 109. The location processor compares 110 the GPS information in the location buffer to entries in a look-up table. If a match is found, an alphanumeric input is provided to the annotator. If no match, the location buffer information is provided to the annotator. The annotator overlays 111 the location information, date/time, camera ID, and frame # in alphanumeric form onto the encrypted encoded image. The resultant image is transmitted, output, or stored 112.

Figure 2:
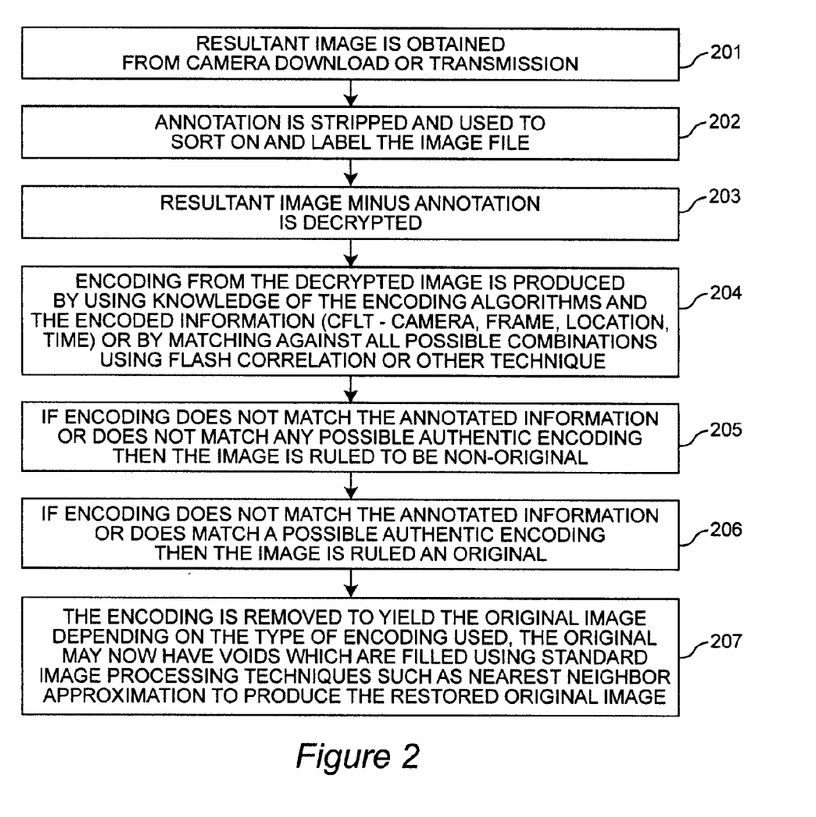
FIG. 2 is a flow chart of the decoding and authentication method of the invention.

FIG. 2 illustrates the method of decoding and authentication of an image. The resultant image is obtained 201. The annotation is stripped 202 and the annotation information is used to label the image file, and may also be used to sort or categorize the image, and to indicate the decryption key. The resultant image which has been stripped of the annotation is decrypted 203 using keys obtained from the annotation. The output is the encoded image. The image is decoded by using the information obtained from the annotation, or by exhaustively attempting each possible decoding 204. If the encoding matches the annotated information, or matches a possible encoding in the case of non-annotated imagery, the image is ruled authentic 206.

If the encoding does not match the annotated information, or does not match any possible encoding in the case of non-annotated imagery, the image is ruled non-authentic. If the image is determined to be authentic, the encoding is removed to yield the original image 207 by reversing the steps used to apply the encoding. If this process leaves voids or unspecified pixels in the image, standard image processing techniques can be used to fill the voids, such as using nearest neighbor fill. The situation is considered analogous to bad pixel replacement in focal plane array camera imagery.

Figure 3:
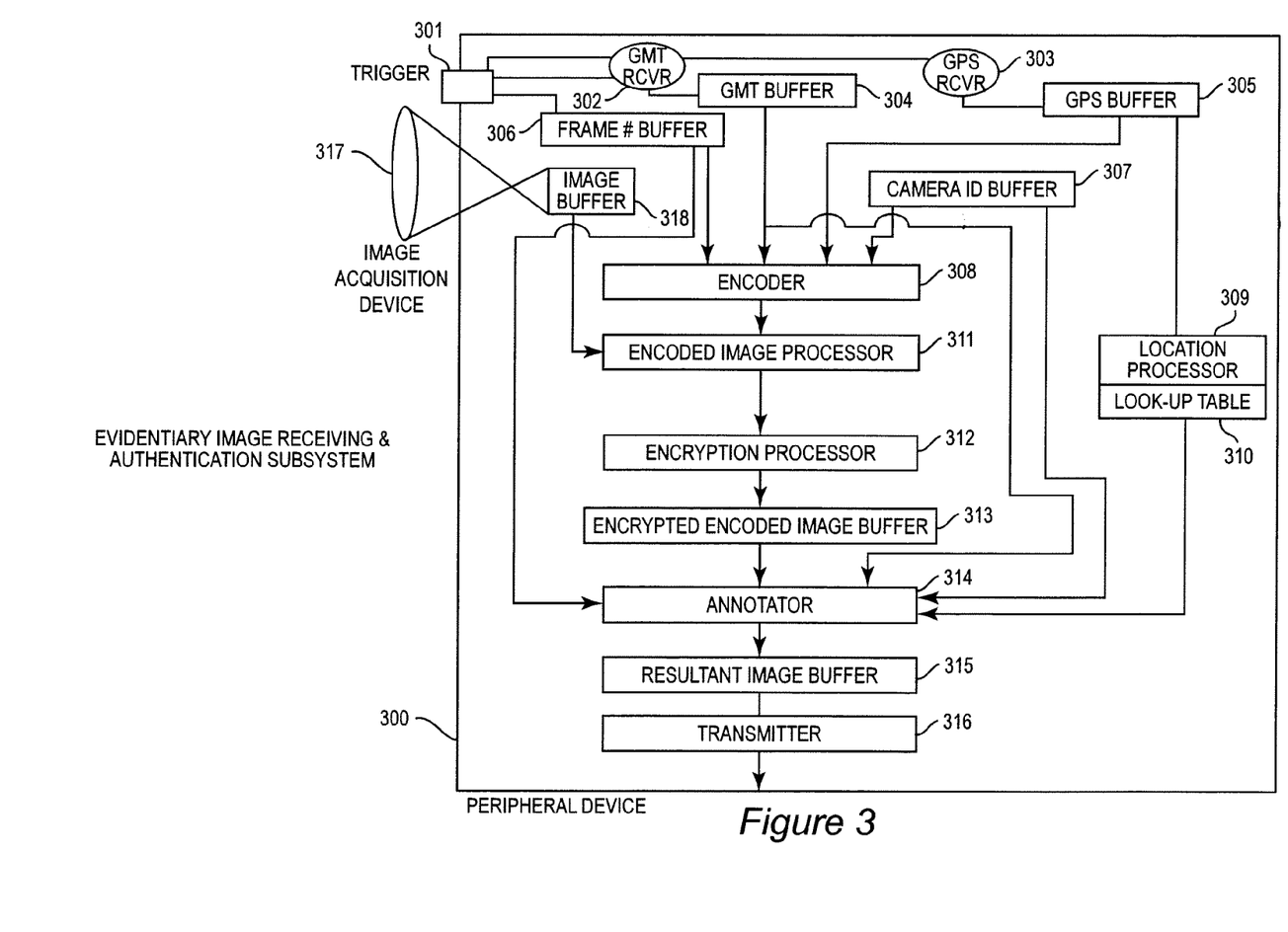
FIG. 3 is a schematic of an evidentiary imaging subsystem.
Figure 4A:
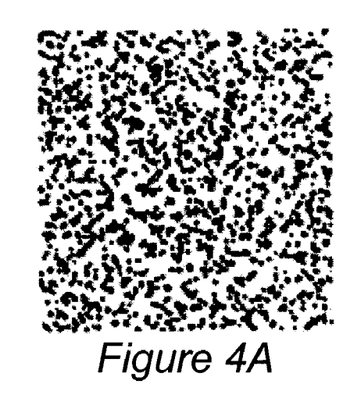
FIGS. 4a, 4b, 4c, and 4d are encoding layers formed by using a grey scale pseudorandom number generator with the values of the date/time, location, camera ID, and frame #, respectively, used as seeds.
Figure 4B:
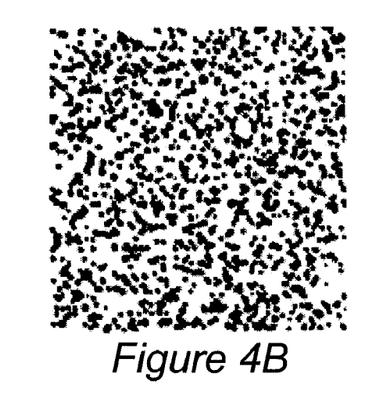
Figure 4C:
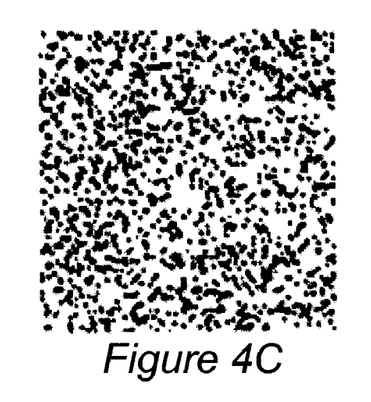
Figure 4D:
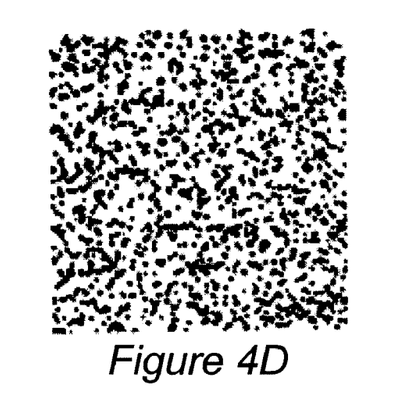
Figure 4E:
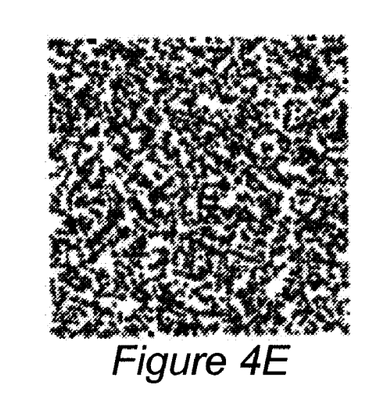
FIG. 4e is the composite encoding formed by superimposition of the four encoding layers 4a, 4b, 4c and 4d.

FIG. 3 presents the apparatus 300 for the evidentiary imaging system. The trigger 301 activates the imaging system. The image acquisition device 317 can be a visual, IR, or other two-dimensional imaging sensor which produces a single frame or sequence of frames and stores the image in the image buffer 318. The GMT 302 and GPS 303 receivers are activated by the trigger 301 and each store their received information in their corresponding buffers, the GMT buffer 304 and GPS buffer 305, respectively. The frame number buffer 306 is a hardware or software element which is advanced by the trigger 301. The camera ID buffer 307 is a hardware or software or firmware element which is set at the factory and can be read by the encoder 308. The location processor 309 includes a dedicated microprocessor or software, plus a lookup table 310 and means for comparing the location in the GPS buffer 305 to items in the lookup table 310. If a match is found, the lookup table entry is sent to the annotator 314. Otherwise, the contents of the GPS location buffer 305 is sent to the annotator 314. The encoder 308 is a hardware or software element which produces a two-dimensional encoding of the information from the camera ID buffer 307, frame # buffer 306, GPS location buffer, and GMT date/time buffers 304. Each item can be used to generate a separate two-dimensional pattern, and the composite of all the patterns forms the encoding.

The primary embodiment uses a pseudorandom binary number generator (not shown) which uses the information from each buffer as a seed to generate a binary pattern of dots. The composite pattern is formed by overlaying all the dot patterns. The encoded image processor 311 combines the encoding and the image. The primary embodiment overlays the encoding on top of the image. The encryption processor 312 encrypts the encoded image and stores it in the encrypted encoded image buffer 313. Any or no encryption process may be used. The annotation 314 forms a composite of the information to be visually displayed on the image and the encrypted image to produce the annotated encrypted image, also called the resultant image, which is stored in the resultant image buffer 315. The resultant image buffer 315 is connected to a printer, storage, or transmission device 316. Movement of the resultant image can be automatic or manually controlled.

Figure 5A:
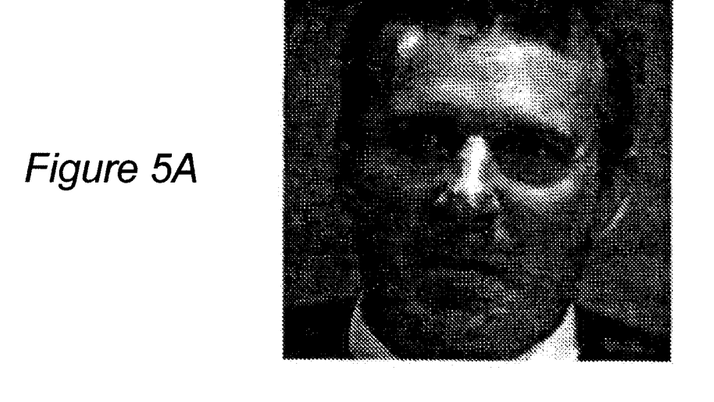
FIGS. 5a, 5b and 5c illustrate a captured image, the composite encoding of authentication data, and the overlay of the encoding and the image, respectively.
Figure 5B:
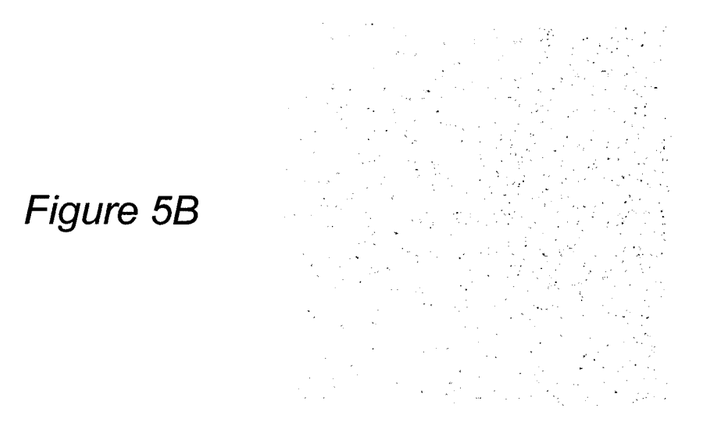
Figure 5C:
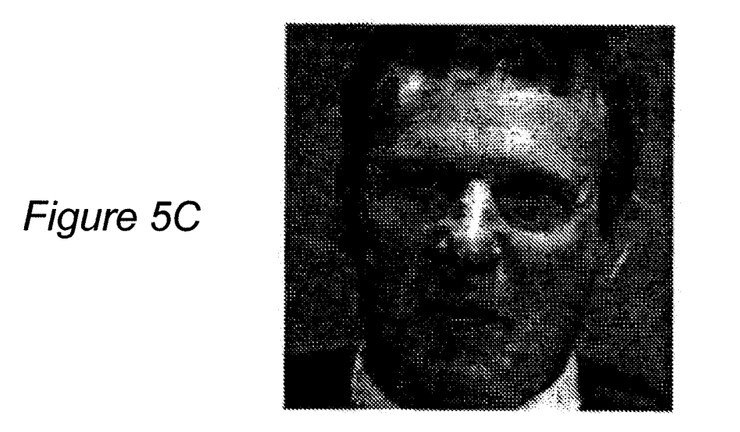
Figure 6A:
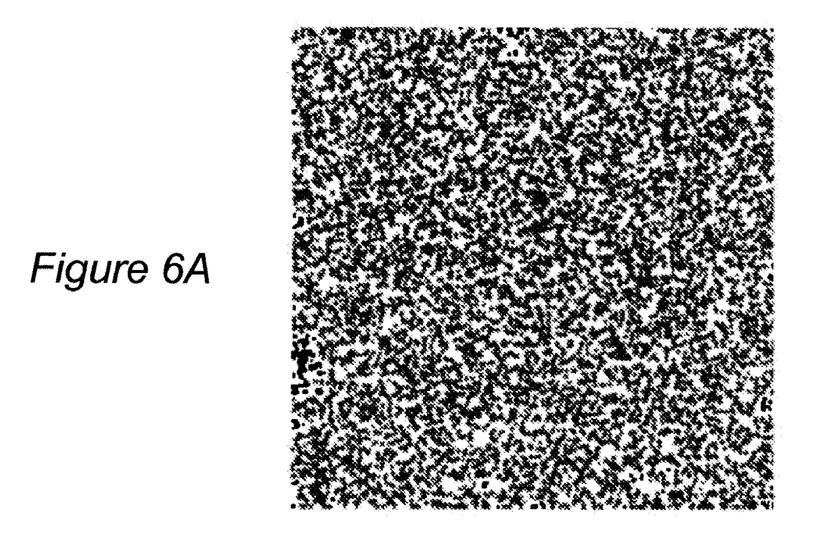
FIGS. 6a, 6b and 6c show an encryption of the encoded image, annotation information, and the annotated scrambled encoded image, respectively.
Figure 6B:
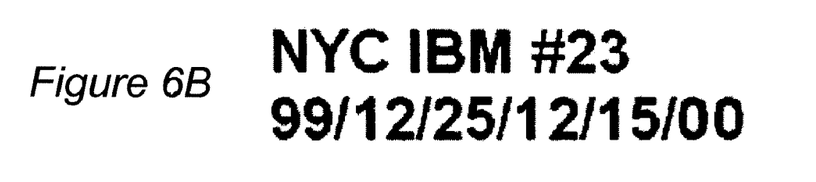
Figure 6C:
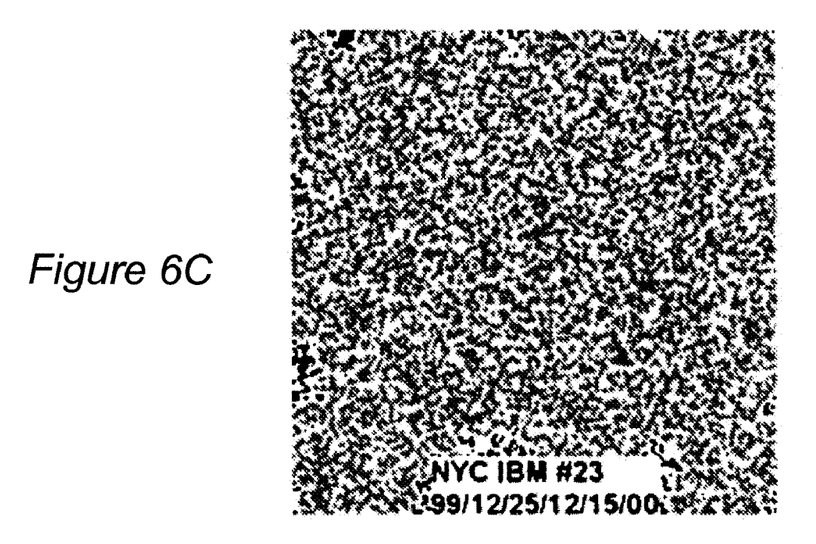

FIGS. 4, 5, and 6 illustrate the production of resultant images in accordance with the method of the Evidentiary Imaging System. FIGS. 4a, b, c, and d are encoding layers formed by using a greyscale pseudorandom number generator with the values of the date/time, location, camera ID, and frame #, respectively, used as seeds. The pixels have been contrast enhanced for visibility, which results in the pixels looking large and all black in these figures. FIG. 4e is the composite encoding formed by superimposition of the four encoding layers.

FIG. 5a illustrates a captured image. 5b is the composite encoding shown here full size. 5c is the overlay of the encoding and the image. FIG. 6a shows an encryption of the encoded image, formed by scrambling the pixels. FIG. 6b is annotation information. FIG. 6c is the annotated scrambled encoded image, also called the resultant image.

Figure 7:
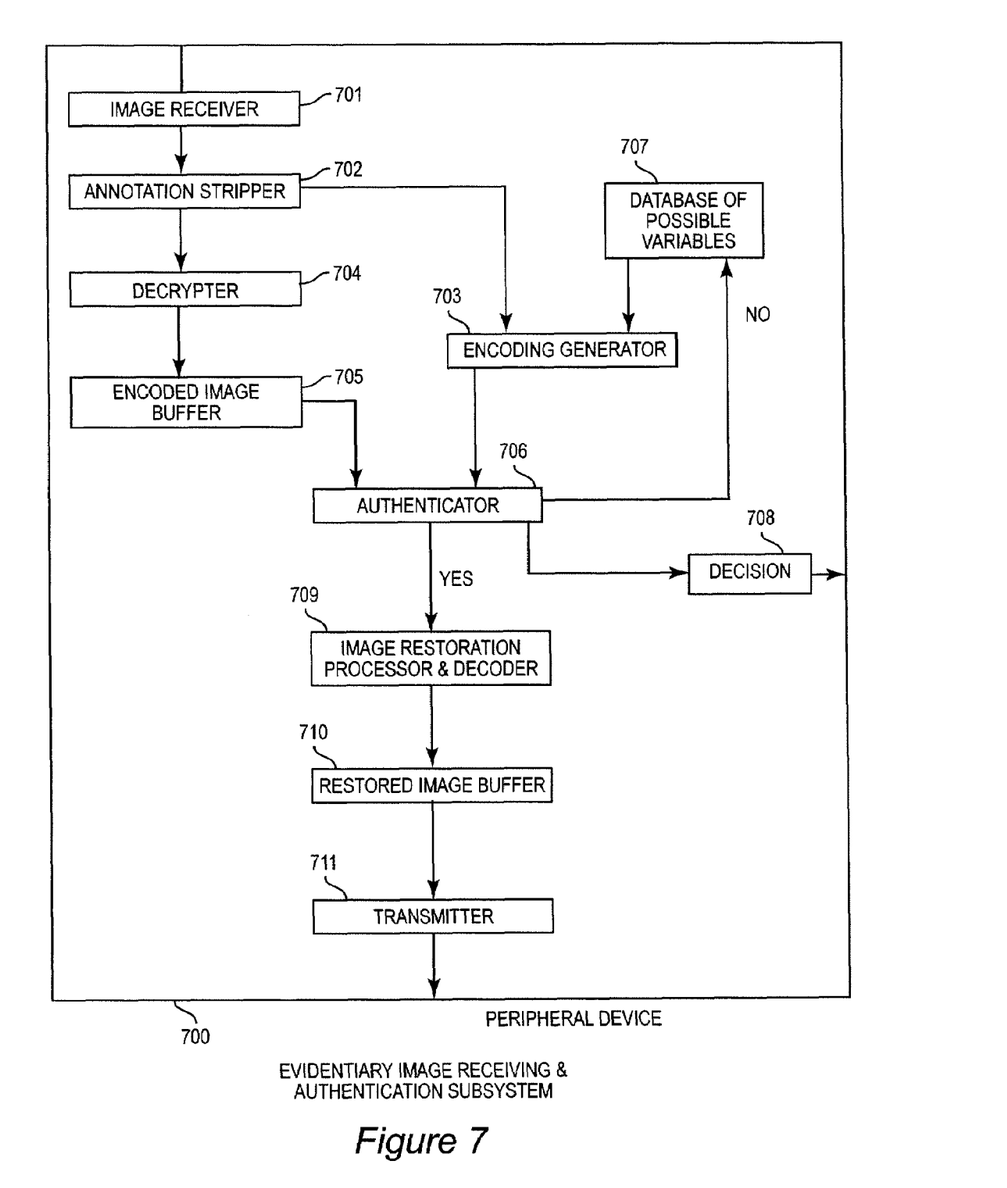
FIG. 7 is a schematic for the Evidentiary Imaging System receiving and authentication subsystem.

FIG. 7 presents the apparatus for the Evidentiary Imaging System receiving and authentication subsystem 700. The image receiver 701 is a hardware device which interfaces with electronic storage or a peripheral communications device; it captures the resultant image from storage or a transmission device. The annotation stripper 702 can be a dedicated processor or software routine which removes the annotated information and forwards it to the encoding generator 703. The decrypter 704 is a dedicated processor or software routine which decrypts the image based upon the encryption routine which is being used within a particular imaging system. The encoded image buffer 705 receives the results after decryption. The encoding generator 703 is a dedicated processor or software routine which takes the annotation information, if available, and produces a two-dimensional encoding. If no annotated information is present, the authenticator 706 accesses a database 707 of all possible variables, sequentially producing each possible encoding.

The authenticator 706 compares the encoding obtained from the annotation information, or each possible encoding, to the encoded image using flash correlation or other comparison technique. If there is adequate correlation between the encoding and the encoded image, the image is judged to be authentic and that decision 708 is output. If there is not adequate correlation, that decision 708 is also output. The image decoder and restoration processor 709 is a dedicated processor or software routine which removes the encoding from the image and restores pixels which have become voids in the process. The resultant image is made available in the restored image buffer 710 to be transmitted, stored, or output 711, along with the authentication certificate.

Figure 8A:
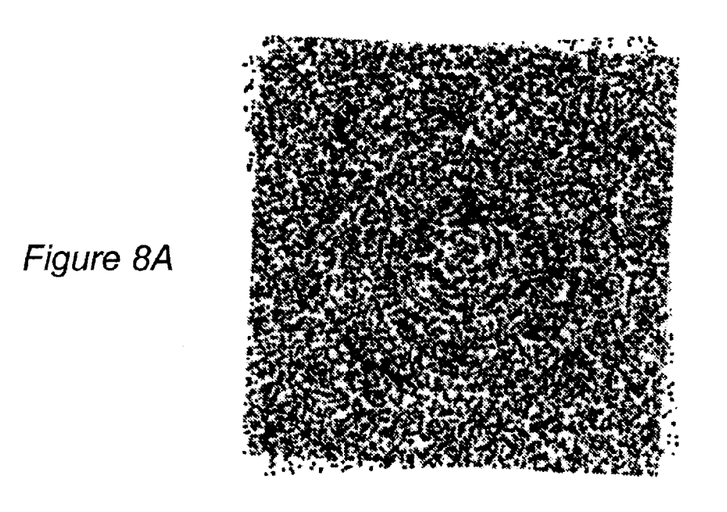
FIGS. 8a and 8b illustrate the +/+ and +/− flash correlation, respectively, of a date/time encoding and the encoded image.
Figure 8B:
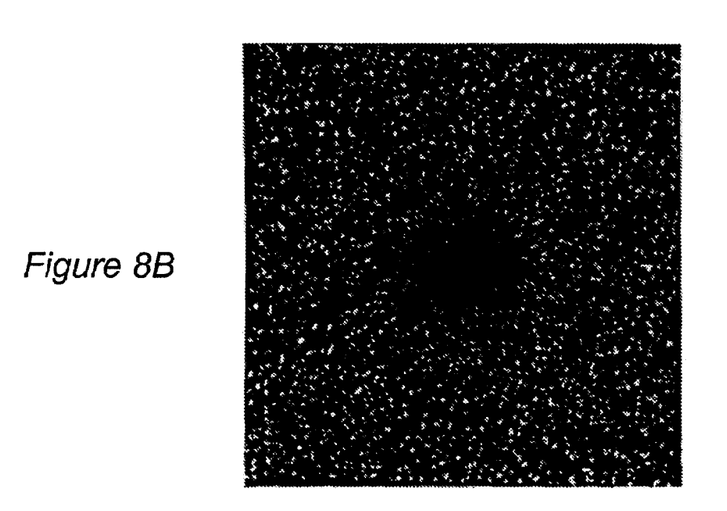

FIG. 8a illustrates the +/+ flash correlation of a date/time encoding and the encoded image. The presence of the rings flash correlation artifact (+/+ FCA) indicates that date/time encoding was used to form the encoded image. The fact that the rings extend everywhere indicate that there has been no modification to the encoded image in any part of the image. FIG. 8b illustrates the +/− flash correlation of the same date/time encoding and encoded image. The presence of the high density spot flash correlation artifact (+/− FCA) in the center indicates that date/time encoding was used to form the encoded image.

It may be difficult in some cases to confirm the presence of the +/+ FCA over the entire image plane. Alternately, the +/− comparison can be performed with the encoded image and the encoding each divided into an array of cells. The presence of a +/− artifact in each cell would indicate that no modification has occurred in each cell. The absence of an artifact in any cell would indicate that modification has been performed in that area of the encoded image.

Figure 9A:
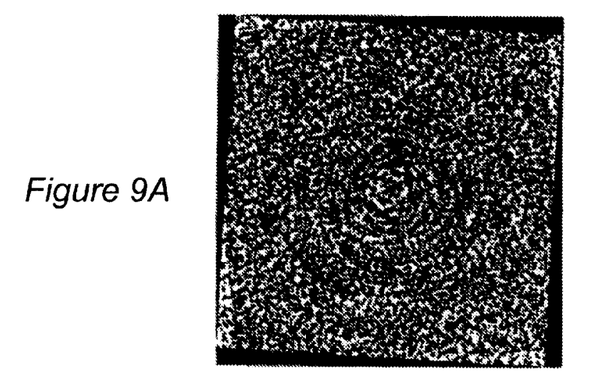
FIGS. 9a and 9b illustrate the +/+ FCA and +/− FCA between the encoded image and the encoding formed of the date/time and location information.
Figure 9B:
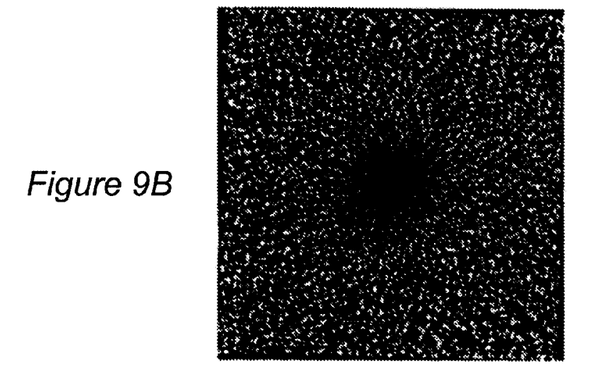
Figure 9C:
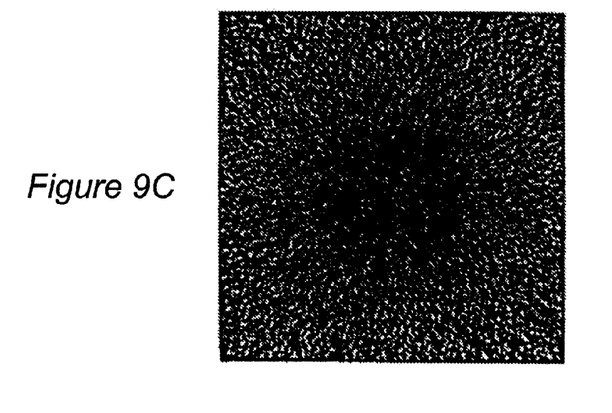
FIG. 9c illustrates the +/− FCA when the encoded image is flash correlated with an encoding formed from the date/time, location, camera ID, and frame #.

FIGS. 9a and 9b illustrate the +/+ FCA and +/− FCA between the encoded image and the encoding formed of the date/time and location. The presence of the FCAs indicates that both the date/time and location used to form this encoding were the same ones used in the imaging system. FIG. 9c illustrates the +/− FCA when the encoded image is flash correlated with an encoding formed from the date/time, location, camera ID, and frame #. The presence of the FCA indicates that all those parameters chosen for the decoder match the same values used in the imaging system.

The Primary Embodiment of the invention is a Vehicle Incident Recording System (not shown) which uses an infrared camera as the imaging sensor and incorporates date/time, location, camera ID, and frame number ID encoding with annotation of this same data into an image header. The camera is mounted in the front grill of the automobile and may be also used to provide realtime night driving aid to the driver. Imagery from the camera is transmitted by wireline to the EIS which is located in a relatively crash-proof area of the vehicle. The EIS can be activated by one or more sensors such as an accelerometer circuit designed to detect braking or sharp turns, or by air bag inflation. Or it could be activated by sensors monitoring driver behavior. Alternately, the EIS can maintain an "endless loop" of encoded images associated with a preceding period of time. The EIS Resultant Imagery would be used for accident reconstruction, or to evaluate the performance of vehicle operators.

A Second Embodiment (not shown) addresses the market for automatic date/time annotation alone. This simplest embodiment covers the incorporation of a GMT receiver with a camera, resulting in an EIS which provides annotation of date and time onto the resulting static or video images. This simplest consumer version of the EIS omits the encryption, limits the encoding to just date/time and camera ID, and provides for visible annotation as a selectable option. The consumer version would still be useful for recording insurance damage, documenting accidents, imaging the condition of items offered for sale, protecting ownership of original art and video creations, documenting will and contract signing, and other uses. However, the imagery would be presented in the clear; that is not encrypted. It therefore offers authentication capability but not privacy when the images are transferred. The decoding keys would remain with the EIS supplier, who would offer authentication services for a fee when it was desired. The EIS user would have proof of ownership of any resulting imagery.

An advanced version of the Second Embodiment has both GMT and GPS receivers, and incorporates a list of locations and a processor which enables them to annotate alphanumeric text instead of geographical coordinates for location. It can include a processor which takes the GPS data and interprets it to the closest location in a list, thereby annotating a country/city/street or landmark designation rather than geographical coordinates onto the image.

A Third Embodiment (not shown) provides for secure transmission of imagery over the internet or other network. The sender submits his personal ID, the ID of the intended recipient and the image to be transmitted. The system encodes his ID and that of the recipient and may also encode the date and time and ID of the transmitting node into an Encoded Data Array. It scrambles the image using a scrambling algorithm key comprised of the sender ID, recipient ID, date and time. It then superimposes the Encoded Data Array and transmits the Resultant. At the receiving end, the system sorts incoming messages by searching for the ID of each possible recipient, addressing each message to the recipient whose ID produces an FCA. The recipient considers all those senders whose ID code it knows and whose transmissions it wishes to receive. It generates the set of Encoded Data Arrays corresponding to those personal IDs and tests them against the received Resultant. If there is a match evidenced by an FCA, it then descrambles the image, using the transmitted date and time to complete the key. If the exact time is unknown, it exhaustively considers various times, testing each for an FCA against the Resultant.

A Fourth Embodiment is an evidentiary imaging system with provision for determining that a given image was in fact produced by a particular camera at a particular location and time, and that the image has not been altered. Each data item: camera ID, location, date, and time can be separately confirmed by a search for an FCA when the encoding of that data item is flash correlated against the Resultant Image. For the image to be authentic and not altered, the Resultant Image and each of the Encoded Data Arrays is divided into cells, and each pair of corresponding cells is flash correlated. A perfect or at least strong FCA, depending upon the level of system noise to be tolerated, must occur for each cell. Multiple iterative tests can be performed by varying the FCA parameters, in particular the angle of rotation between the encoding image and the Resultant image. Since flash correlation is a sampling technique, use of a range of parameters for testing authenticity helps to defeat adversaries who would attempt to make minor pixel-by-pixel modifications to an encoded image, hoping that their minor modifications would not be significant enough to be discovered.

Other embodiments of the EIS will include those listed above as applications.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. System for authenticating digital information, comprising:
  a) an image acquisition device for producing an original array of two-dimensional digital information;
  b) means for obtaining current date and time information from satellite or radio broadcasts;
  c) means for obtaining current location information from satellite or radio broadcasts;
  d) means for identifying a Sensor ID for the image acquisition device;
  e) an encoder for converting date/time, location, and Sensor ID into two-dimensional format called the Encoded Data Array;

f) an embedder for combining the Encoded Data Array and the Original Array into a new Composite Array h) a Transmission device to transfer the Composite Array to a recipient;

n) means for comparing said transferred Composite Array to said Encoded Data Array, said comparing means thereby being able to use said Encoded Data Array to determine whether the information in said Encoded Data Array is embedded in said Composite Array, said comparing means also being able to separately determine whether said date/time information, said location information, and said Sensor ID information is embedded in said Composite Array, said comparing means being further limited by being able to make said determination without extracting or otherwise decoding the information in said Encoded Data Array;

j) a decoder with fault indicator when date/time, location, and source cannot be decoded;

k) an Encoding Extractor for removing the Encoded Data Array from the Composite Array;

l) means for restoring the Original Array at pixel locations used for the Encoding; and m) means for determining changes between the Restored Original Array and the Original Array.

2. System as in claim 1 in which the Original Array size is increased by a factor and subpixels are used in steps f, h, n, j, k, l, and m.

3. System as in claims 1 or 2 in which the encryption process involves scrambling the pixels or subpixels.

4. System as in claims 1 or 2 in which steps b and c utilize the GPS (Global Positioning Satellite) system.

5. System as in claims 1 or 2 in which the Decoder utilizes flash correlation to select pixel locations of the Encoded Data Array and test for authenticity.

6. System as in claim 5 in which flash correlation is used to verify that the encoded data is the same as data which is expected to be encoded into a particular Original Array.

7. System as in claim 5 in which flash correlation is used to identify the encoded data by exhaustive comparison against each possible value for each of date/time, location, and source.

8. System as in claims 1 or 2 in which the Sensor ID in step d includes a biometric identifier of the User of the image acquisition device.

9. System as in claims 1 or 2 in which the Sensor ID in step d includes the serial number and odometer setting of the image acquisition device of step a.

10. System as in claims 1 or 2 in which the change detector of step m evaluates subsections of the Restored Original Array and the Original Array to localize areas of difference.

11. System as in claims 1 or 2 in which date/time, location, and source are annotated onto the Encrypted Composite Array.

12. System as in claims 1 or 2 in which the encoded data provides the key to the encryption and decryption algorithms.

13. System of claims 1 or 2 in which the operation of the image acquisition device is triggered by the change of status of another device.

14. System of claim 13 in which the triggering device is a face recognition system.

15. System of claim 13 in which the triggering device is a speed sensor.

16. System of claim 13 in which the triggering device is an alarm condition sensor.

17. System of claims 1 or 2 in which the Encoding is performed by overlaying a pattern of pixels of a particular color or grey scale value.

18. System of claims 1 or 2 in which the Encoding is performed by steganography.

19. System of claims 1 or 2, further comprising:

g) an encrypter for encrypting the Composite Array;

i) a decrypter to restore the Composite Array.

20. System as in claim 19 in which the encryption of step g and decryption of step i is repeated more than one time.

21. A method for authenticating digital images, comprising the steps of:

capturing a digital image;

recording authentication information at the time and place of said capturing, said authentication information being unique to said digital image and comprising a plurality of pieces of information, including at least one piece of information from a source independent of said capturing;

encoding said authentication information into a data array mapable to said digital image;

mapping said data array to said digital unage, thereby creating a composite array;

optionally encrypting said composite array;

optionally annotating said composite array;

comparing said data array, optionally encrypted and annotated, to a target composite array, wherein said comparing determines whether said authentication information is embedded in said target composite array, said comparing also being able to separately determine whether each of said plurality of pieces of information is embedded in said target composite array, said comparing being further limited by being able to make said determination without extracting or otherwise decoding information in said data array, thereby proving that said target composite array is an authentic copy of said composite array.

22. The method of claim 21, wherein said at least one piece of information from a source independent of said capturing is GMT time information.

23. The method of claim 21, wherein said at least one piece of information from a source independent of said capturing is GPS location information.

24. The method of claim 21, wherein said at least one piece of information from a source independent of said capturing is GMT time information and GPS location information.

25. The method of claim 21, wherein said comparing step is flash correlation of said data array with said target composite array.

26. The method of claim 25, wherein said digital image is a sequence of digital images, there being a unique set of authenticating information for each digital image in said sequence and a corresponding unique data array, there being a unique composite array corresponding to each digital image in said sequence, wherein said composite array is a sequence of composite arrays and said target composite array is a sequence of target composite arrays, and wherein said flash correlation determines whether said sequence of target composite arrays is an authentic copy of said sequence of composite arrays.

27. The method of claim 26, wherein said sequence of digital images is a video image and said flash correlation is done in real time.

28. A system for authenticating digital images, comprising:

means for capturing a digital image;

means for recording authentication information at the time and place of said capturing, said authentication information being unique to said digital image and comprising a plurality of pieces of information, including at least one piece of information from a source independent of said capturing;

means for encoding said authentication information into a data array mapable to said digital image;

means for mapping said data array to said digital image, thereby creating a composite array;

means for optionally encrypting said composite array;

means for optionally annotating said composite array;

means for comparing said data array, optionally encrypted and annotated, to a target composite array, wherein said comparing determines whether said authentication information is embedded in said target composite array, said comparing means also being able to separately determine whether each of said plurality of pieces of information is embedded in said target composite array, said comparing means being further limited by being able to make said determination without extracting or otherwise decoding information in said data array, thereby proving that said target composite array is an authentic copy of said composite array.

29. The system of claim 28, wherein said at least one piece of information from a source independent of said capturing is GMT time information.

30. The system of claim 28, wherein said at least one piece of information from a source independent of said capturing is GPS location information.

31. The system of claim 28, wherein said at least one piece of information from a source independent of said capturing is GMT time information and GPS location information.

32. The system of claim 28, wherein said comparing step is flash correlation of said data array with said target composite array.

33. The system of claim 32, wherein said digital image is a sequence of digital images, there being a unique set of authenticating information for each digital image in said sequence and a corresponding unique data array, there being a unique composite array corresponding to each digital image in said sequence, wherein said composite array is a sequence of composite arrays and said target composite array is a sequence of target composite arrays, and wherein said flash correlation determines whether said sequence of target composite arrays is an authentic copy of said sequence of composite arrays.

34. The system of claim 33, wherein said sequence of digital images is a video image and said flash correlation is done in real time.

* * * * *